INVENTOR.
JOHN MICHAEL MATEJEK
BY George P. Nielmer
AGENT

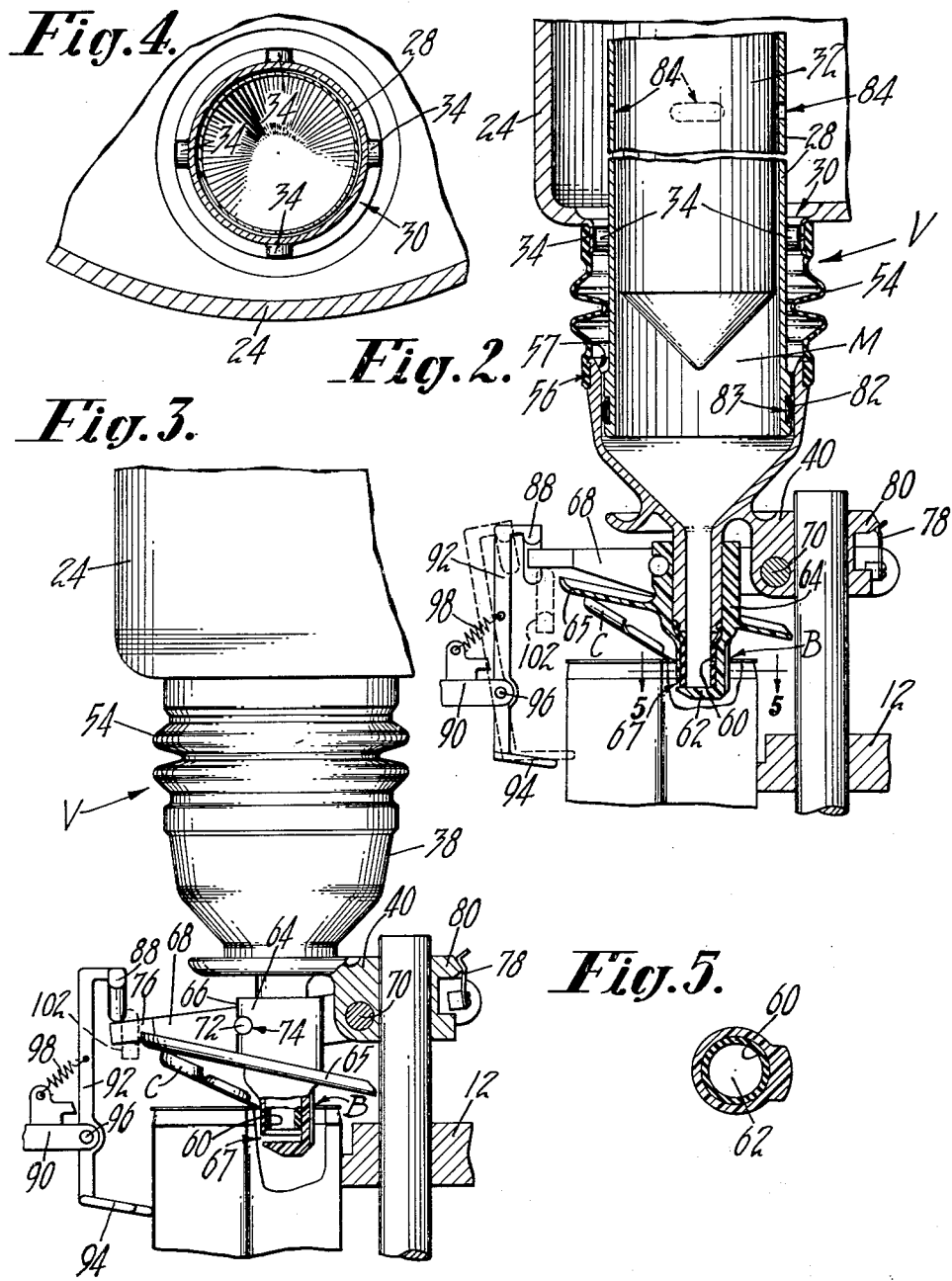

United States Patent Office 3,010,618
Patented Nov. 28, 1961

3,010,618
LIQUID FILLING MACHINE
John Michael Matejek, Plainfield, N.J., assignor to American Can Company, New York, N.Y., a corporation of New Jersey
Filed Apr. 17, 1959, Ser. No. 807,156
8 Claims. (Cl. 222—450)

The present invention relates to liquid filling machines and has particular reference to a filling valve particularly suitable for filling measured quantities of foamable liquids such as milk into fibre containers at high speeds without substantial foaming.

The improved filling valve of the instant invention is in some aspects an improvement over the valve disclosed in United States Patent 2,755,980, which issued on July 24, 1956, to Samuel S. Jacobs and William Pechy, and also over the valve disclosed in United States Patent 2,811,282, which issued on October 29, 1957, to William Pechy. Both patents were assigned to the instant assignee.

An object of the instant invention is the provision of a filling valve which is designed to minimize turbulence during the flow of milk from the reservoir into the measuring chamber of the valve in order to minimize foaming of the product.

Another object is the provision of a filling valve which is so constructed that all pockets which might entrap the product are eliminated, so that cleaning of the valve is greatly facilitated.

Another object of the invention is the provision of a filling valve which is constructed so that the milk flows smoothly downwardly into the measuring chamber through an unrestricted 360° circular opening, thus providing a high speed measuring cycle with a minimum of agitation of the product.

Numerous other objects and advantages of the invention will be apparent as it is better understood from the following description, which, taken in connection with the accompanying drawings, discloses a preferred embodiment thereof.

Referring to the drawings:

FIG. 2 is a fragmentary view similar to FIG. 1, showing the parts in position at the end of the measuring cycle preparatory to opening the valve nozzle to permit the measured liquid to flow into the container;

Figure 1:
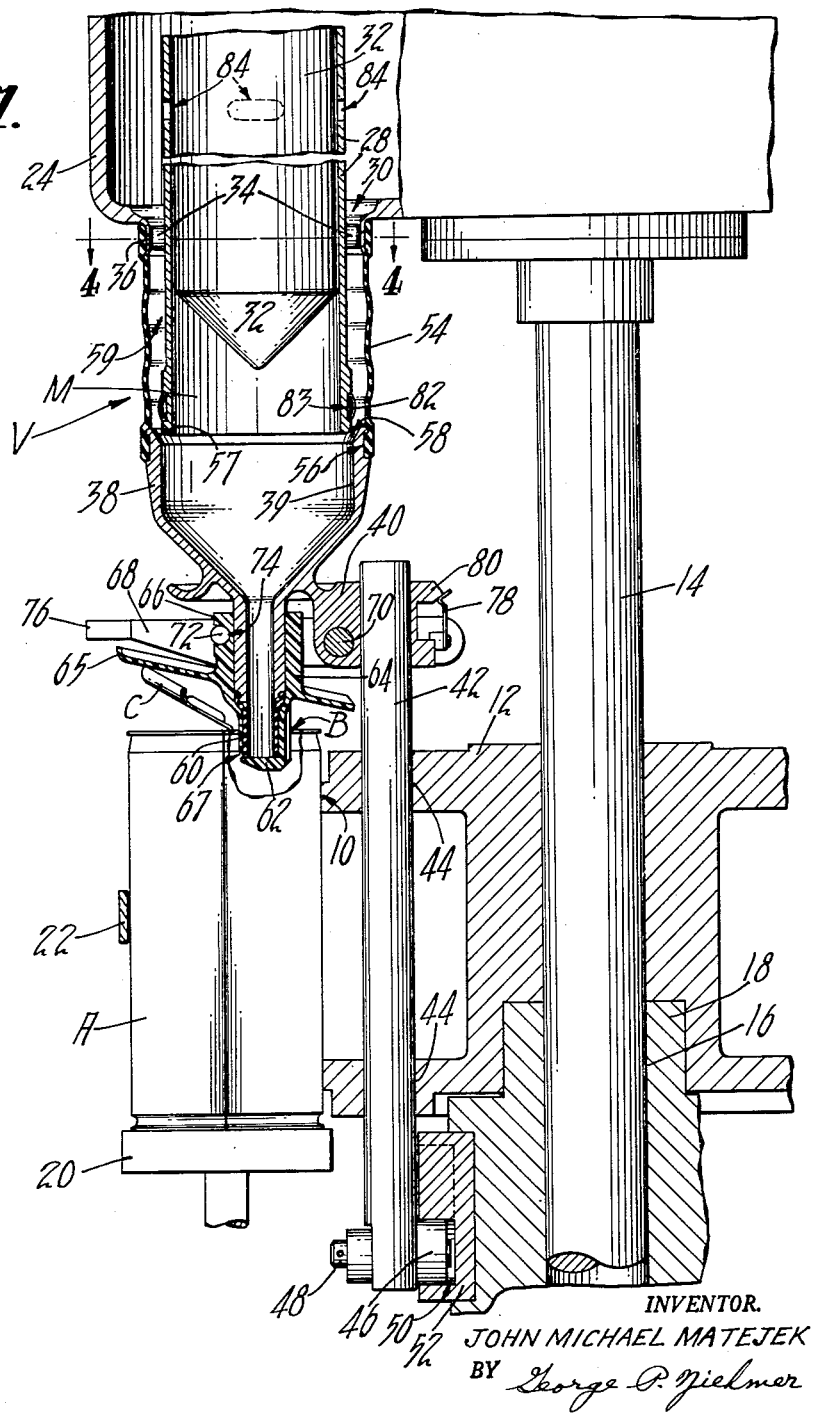
FIGURE 1 is a sectional view taken through a portion of a milk filling machine embodying the instant invention, with parts broken away, the parts being shown in position to permit the milk to flow from the reservoir into the measuring chamber.

FIG. 3 is a view similar to FIG. 2, but showing the valve nozzle in open position to permit the measured liquid to flow into the container; and FIGS. 4 and 5 are sectional views taken substantially along the lines 4—4 and 5—5 of FIGS. 1 and 2, respectively.

As a preferred or exemplary embodiment of the instant invention, the drawings illustrate a single filling valve V mounted in a rotary multiple valve machine which is adapted to fill liquid products such as milk or the like into rectangular fibre containers A, here shown as of the construction disclosed in United States Patent 2,085,979, issued July 6, 1937, to John M. Hothersall, entitled "Container." As shown, the container A is provided with a circular filling opening B disposed adjacent one of its corners, which opening is adapted to be sealed, after the container A is filled, by a fibre friction plug C hingedly attached to the container top adjacent the opening B.

The container A is fed into the machine in upright position with its friction plug C in open position, and is received in a pocket 10 formed in a rotating turret 12, which is keyed to a vertical shaft 14. The shaft 14 is journalled in a bearing 16 formed in a frame piece 18 which forms a part of the main frame of the machine. During its rotary movement through the machine, the container A is supported on a conventional type cam-actuated lifter pad 20 which raises to filling position, and is maintained in the turret pocket 10 by an outside guide rail 22.

The milk or other liquid product is carried in a tank or reservoir 24, which is secured to the upper end of the shaft 14 and is rotatable therewith, and is filled into the containers A in measured quantities by a plurality of filling valves, one of which, designated generally by the letter V, is provided for each pocket 10 of the turret 12.

Each filling valve V includes a tubular measuring sleeve or housing 28 which defines a measuring chamber M. The housing 28 is disposed in an opening 30 formed in the bottom of the reservoir 24 and projects upwardly above the level of the milk therein and is secured in place in the upper closed end (not shown) of the reservoir 24, and an adjustable hollow displacement plunger 32 which is adjustably mounted in the measuring housing 28, with the outer cylindrical surface of the plunger spaced from the inner wall of the housing to provide an annular passageway therebetween. A suitable construction for the upper end of the measuring housing 28 and displacement plunger 32 is disclosed in United States Patent 2,795,361, issued June 11, 1957, to William Pechy, entitled "Measuring Chamber Volume Control for Filling Machine."

The lower end of the housing 28 extends downwardly below the reservoir 24 and is held in place by a group of four laterally projecting studs 34 (see FIG. 4) which engage against the inside surface of a downwardly projecting flange 36 which defines the opening 30 in the bottom of the reservoir 24.

A funnel 38 having a conical interior wall portion 39 is mounted for vertical reciprocation adjacent the lower end of the measuring housing 28. The funnel 38 is formed with an integral, inwardly projecting block 40 which is secured to the upper end of a vertical actuating rod 42 slidably mounted in bearings 44 formed in the turret 12. At its lower end, the rod 42 is provided with a cam roller 46 which is mounted on a cross pin 48 and operates in a circular cam groove 50 of a stationary cam 52 mounted on the frame piece 18.

The upper end of the funnel 38 is connected to the bottom of the reservoir 24 by means of a flexible sleeve 54, preferably made of rubber or a similar elastic material, which surrounds the lower end of the measuring housing 28. The upper end of the flexible sleeve 54 elastically and tightly engages the outside of the reservoir flange 36 and is held in place by the outwardly turned bottom edge of the flange 36, while the lower end of the sleeve 54 snaps into and is held in place by a circular groove 56 formed in the upper end of the funnel 38.

As seen in FIG. 1, the inside upper edge of the funnel 38 is provided with a conical taper 57. As a result, when the funnel is in its lowermost, measuring position, it is spaced away from the measuring housing 28 so that a full 360° opening 58 exists between the lower end of housing 28 and the upper end of the funnel 38. Also, in this position, the flexible sleeve 54 is spaced from the measuring housing 28, so that a full 360° passageway 59 exists between the reservoir 24 and the funnel 38, except for the four small studs 34. Thus, the milk flows smoothly and quickly from the reservoir 24 into the funnel 38 and, after filling the funnel, rises in the measuring housing 28 until the level of the milk in the housing 28 reaches the level of the milk in the reservoir. During this flow of milk from the reservoir, the studs 34 do not cause appreciable foaming because they are constantly immersed in the liquid.

As seen in FIG. 1, the bottom end of the funnel 38 in this position of the operating cycle is maintained in closed position. To accomplish this, the funnel 38 is provided with a tubular rubber sealing sleeve 60, which is secured to and depends from the lower end of the funnel 38. The lower end of the sealing sleeve 60 is maintained in sealing contact with a rigid horizontal sealing seat 62 formed integral with a tubular valve nozzle 64 which surrounds the sealing sleeve 60 and the lower portion of the funnel 38 and is vertically movable relative thereto. The valve nozzle 64, which is provided with an integral inclined deflector plate 65 to prevent the dripping of condensed atmospheric moisture from the overlying portions of the measuring valve onto the top of container A, is preferably formed from a piece of rigid non-corrosive material, such as stiff nylon, and at its upper end is provided with a flat outer face 66. An arcuate filling opening 67 is cut into the nozzle 64 immediately above the sealing seat 62, as seen in FIG. 3.

The valve nozzle 64 is actuated by a horizontally disposed arm 68 which intermediate its length is mounted on a pivot pin 70 carried in the funnel block 40. The arm 68 extends radially outwardly beyond the valve nozzle 64 and carries a pin 72 which engages in a notch 74 formed in the flat face 66 of the valve nozzle 64 to operatively connect the valve nozzle 64 to the arm 68.

The outer end of the arm 68 terminates in a free end 76 which is engageable with cam projections for raising and lowering the arm 68, as will be hereinafter explained. The inner end of the arm 68 carries a leaf spring 78 formed with a V-shaped free end which engages beneath a locking lug 80 formed in the funnel block 40 to retain the arm in raised position, in which position it holds the valve nozzle 64 in closed position.

As the level of the milk in the measuring housing 28 rises, the milk rises through the annular passageway between the plunger 32 and the housing 28 until it has reached the level of the milk in the reservoir, the cam roller 46 then enters an upwardly inclined portion of the cam groove 50, thus lifting the funnel 38 to the position shown in FIG. 2, this movement of the funnel 38 being permitted by the flexing of the flexible sleeve 54 to the position shown in FIGS. 2 and 3. During its upward movement, the conical wall 39 of the funnel 38 engages against a kidney ring or gasket 82 carried in a groove 83 formed in the lower end of the measuring housing 28, thus cutting off communication between the reservoir 24 and the measuring chamber M. This lifting of the funnel 38 also lifts all the milk contained within the measuring chamber M so that the excess milk within the chamber M rises through the annular passageway and flows out through a plurality of overflow ports 84, which are formed in the housing 28 above the level of the milk in the reservoir, and returns to the reservoir. Thus the milk which is retained within the measuring chamber M comprises the desired measured quantity which is to be filled into the container A.

It will be understood that the lifter pad 20 raises the container A a distance which corresponds to the upward movement of the funnel 38, so that the valve nozzle 64 remains inserted within the container.

Continued rotation of the machine now results in the opening of the valve nozzle 64 to permit this measured quantity of milk to flow into the container A through the opening 67. This opening is effected by a downwardly inclined cam segment 88 which is affixed to a stationary part 90 of the machine frame so that it has no rotary movement with the turret 12. The cam 88 is mounted on the upper end of a vertical lever 92 which forms a part of a no-can no-fill device, the lower part of the lever 92 being provided with an inwardly extending container feeler arm 94.

The lever 92 is mounted on a pivot pin 96 which is mounted in the frame part 90, and is normally held in inclined position, as shown in dotted lines in FIG. 2, by a spring 98. In this inclined position, the cam section 88 is disposed in inoperative position outwardly of the free end 76 of the horizontal arm 68 and the container feeler 94 is disposed in the path of travel of the container A. In the event the container A is missing from its pocket 10, the feeler arm 94 will not be engaged and the cam 88 will remain in the inoperative position shown in dotted lines, so that the valve nozzle 64 remains closed. However, when a container A is present within the valve pocket 10, the feeler member 94 is rocked outwardly, thus moving the cam section 88 inwardly to the operative position shown in solid lines in FIGS. 2 and 3, wherein it engages and depresses the free end of the horizontal arm 68, thus moving the valve nozzle 64 downwardly relative to the sealing sleeve 60, thereby uncovering the arcuate opening 67, as seen in FIG. 3, and permitting the milk to flow in a fan-like pattern against the side walls of the container A. The milke then flows down these side walls and fills the container A with a minimum of turbulence and foaming. During this filling operation, the valve nozzle 64 is maintained in open position by the weight of the milk, and by the leaf spring 78, which snaps into position above the locking lug 80 when the arm 68 is initially depressed by the cam 88.

After the filling operation has been completed, the lifter pad 20 lowers the container A from the nozzle 64 and positions it for removal from the machine. During the time the container is thus being removed, the rotation of the turret 12 brings the free end 76 of the horizontal arm 68 into engagement with a stationary, upwardly inclined cam segment 102 (shown in dotted lines in FIGS. 2 and 3) which engages the bottom of the free end 76 of the horizontal arm 68 and raises this arm to the position shown in FIG. 2, thereby closing the valve nozzle 64. This upward movement of the arm 68 results in the leaf spring 78 again snapping beneath the locking lug 80, thereby holding the filling nozzle in its raised, closed position until it is reopened by the cam 88 in its next cycle of operation. As soon as the valve nozzle 64 has been moved to this closed position, the cam roller 46 enters a downwardly inclined section of the cam groove 50 so that the funnel 38 is lowered to the position shown in FIG. 1, thereby permitting the milk to flow from the reservoir and into the measuring chamber M to initiate another filling cycle.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a liquid filling machine, the combination of a supply reservoir having an opening in a lower portion thereof, a measuring housing secured relative to said reservoir and having an open bottom disposed below said reservoir, a longitudinally contractible sleeve member surrounding said housing and in sealed engagement with said reservoir around said opening therein, said sleeve member being spaced from the exterior wall of said housing to form a passageway therebetween connecting said reservoir with said measuring housing through said open bottom of the housing, a cut-off member adjacent the bottom of said housing and in sealed engagement with said sleeve member below said sealed engagement between the sleeve and reservoir, means for moving said cut-off member longitudinally and thereby contracting said sleeve member to effect sealing engagement of the cut-off member with said housing to terminate the flow of liquid into said housing, and means associated with said cut-off member for permitting discharge from said measuring housing of the liquid contained therein.

2. The mechanism of claim 1, wherein said cutoff member comprises a funnel, the upper portion of which is sealingly engageable against the outside surface of said housing, and wherein said discharge means comprises a nozzle mounted on the lower end of said funnel.

3. The mechanism of claim 2, wherein said sleeve member comprises a tubular flexible sleeve connected at one end to said funnel and at the other end to the bottom of said reservoir.

4. In a liquid filling machine the combination of a supply reservoir, an opening formed in the bottom of said reservoir, an open bottomed tubular measuring housing disposed in said reservoir and extending through the bottom of said reservoir in spaced relationship to the edge of said opening, and having a bottom portion projecting downwardly below said reservoir, a movable funnel mounted for vertical reciprocation adjacent the bottom of said housing, said funnel when in its lowermost position being spaced from said measuring housing, a flexible sleeve connecting the upper end of said funnel with said reservoir around said opening, said flexible sleeve surrounding the downwardly projecting portion of said measuring housing and being spaced therefrom when said funnel is in its lowermost position whereby an open 360° passageway connecting said reservoir with said funnel exists between said sleeve member and said housing to permit the flow of liquid from said reservoir into said funnel and thence into said measuring housing through its open bottom, means for lifting said funnel to bring it into sealing engagement with said projecting bottom portion of said measuring housing to cut off communication between said reservoir and said funnel and said measuring housing and to isolate the liquid in said funnel and measuring housing, and nozzle means mounted on the lower end of said funnel for permitting discharge of said isolated liquid into a container.

5. The mechanism of claim 4 wherein a sealing gasket is interposed between said housing and said funnel to establish said sealing contact.

6. The mechanism of claim 5 wherein the upper interior portion of said funnel is cylindrical and is upwardly slideable along said downwardly projecting portion of said measuring housing after it has made sealing contact with said measuring housing to raise the isolated liquid in said housing so that the level of liquid in said housing is higher than the level of liquid in said reservoir.

7. The mechanism of claim 5 wherein an overflow port is provided in said housing above the level of liquid in said reservoir to establish the ultimate level of liquid in said housing.

8. In a liquid filling machine, the combination of a supply reservoir having an opening in a lower portion thereof, a measuring housing secured relative to said reservoir and having an open bottom in a tubular wall portion thereof disposed below said reservoir, a longitudinally contractible sleeve member surrounding said housing and having its upper end in sealed engagement with said reservoir around said opening therein, said sleeve member being spaced from the exterior wall of said housing to form a passageway therebetween connecting said reservoir with said measuring housing through said open bottom of the housing, a cut-off member having an annular wall portion thereof adjacent said open bottom of said housing axially aligned with said tubular wall portion of the housing and in sealed engagement with the lower end of said sleeve member, means for relatively moving said annular wall of the cut-off member and tubular wall portion of the housing longitudinally toward each other, sealing means between said annular and tubular walls to cut off the flow of liquid to said housing, said contractible sleeve member contracting to permit said longitudinal movement of said walls to cut off said flow of liquid, and means associated with said cut-off member for permitting discharge from said measuring housing of the liquid contained therein.

References Cited in the file of this patent

UNITED STATES PATENTS

| | | |
|---|---|---|
| 2,144,628 | Hothersall | Jan. 24, 1939 |
| 2,222,617 | Hothersall | Nov. 26, 1940 |